Dec. 6, 1955  X. B. K. GREEN  2,725,636
MASTER GAGE FOR INTERNAL BORE GAGES
Filed May 24, 1954
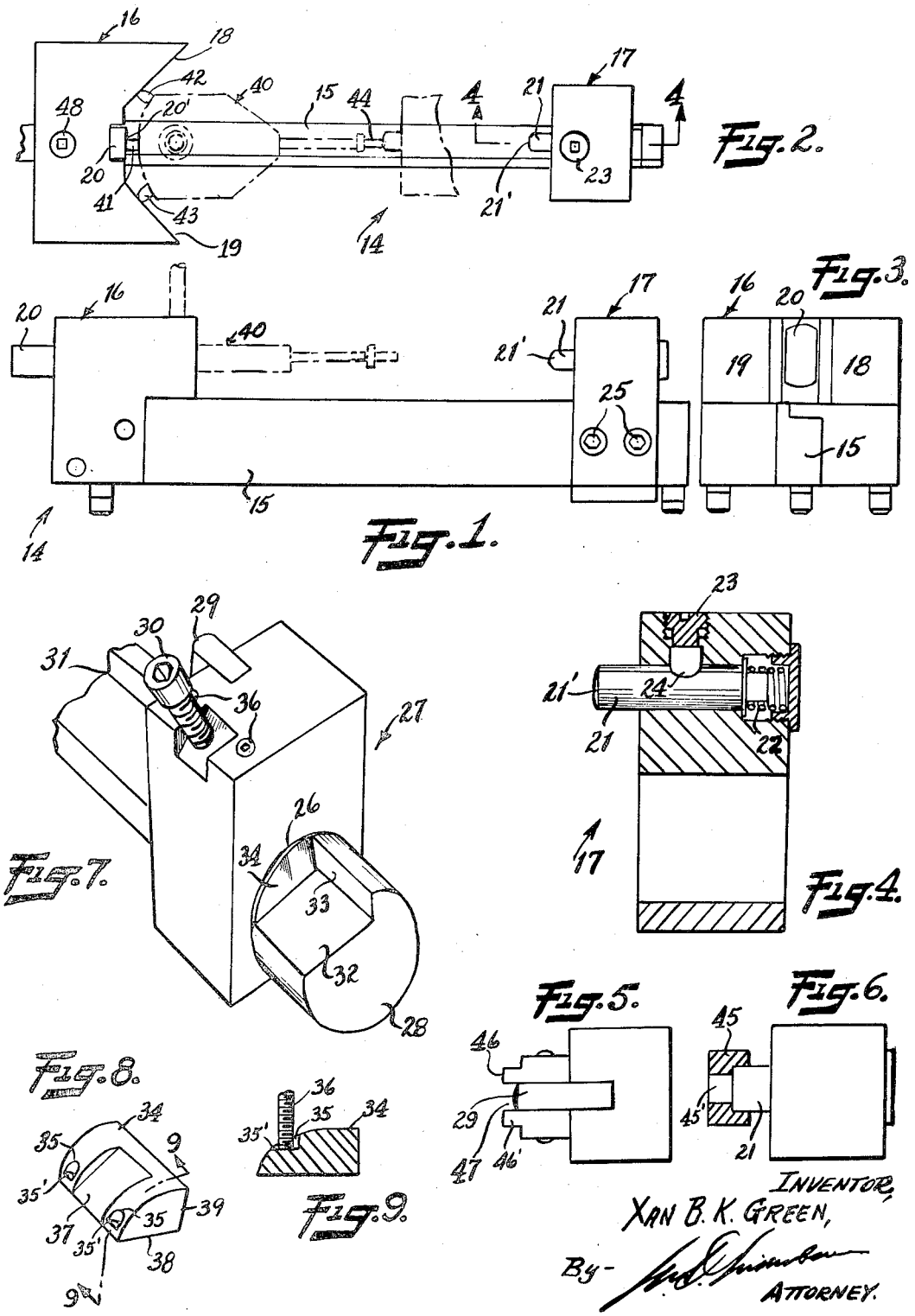
INVENTOR,
XAN B. K. GREEN,
By-
ATTORNEY.

United States Patent Office 2,725,636
Patented Dec. 6, 1955

2,725,636

MASTER GAGE FOR INTERNAL BORE GAGES

Xan B. K. Green, New Paltz, N. Y., assignor to Boice Mfg. Co., Inc., Staatsburg, N. Y., a corporation of New York Application May 24, 1954, Serial No. 431,643

3 Claims. (Cl. 33—143)

The present invention relates to gages and more particularly to a master gage for setting and checking internal bore gages which are of the type including a head having a fixed measuring pin and a movable measuring pin in alignment; such pins extending in opposite directions from said head. Also, there are two centering pins extending from said head, one at each side of the movable measuring pin; the axes of all said pins being coplanar. Said four pins are either all parallel or the centering pins are divergent with respect to the head, in which instance the angle between said centering pins is bisected by the line of the measuring pins. This brief description will suffice for those versed in the art to recognize the internal bore gages which are to be set and checked with the master gage which is the subject of this invention.

Attempts heretofore in master gage construction, necessitated the use of interchangeable parts in order to accommodate internal bore gages of various sizes ranging from comparatively small to comparatively large internal diameters.

The principal object of this invention is to provide a novel and improved master gage which can be used to set and check internal bore gages of all sizes without changing any of its parts and only requiring that its jaws be set precisely such distance apart as the dimension to be gaged.

Essentially, the master gage herein includes a track bar carrying a pair of jaws; one of which need be movable along and securable at any desired position on said track bar. Each jaw carries an anvil, one to be contacted by the fixed measuring pin of the internal bore gage dealt with and the other to be contacted by the movable measuring pin of such bore gage. The distance between said anvils is set by the use of precision measuring blocks which are then removed from between said anvils.

Another object of this invention is to provide a master gage of the character mentioned, of novel and improved construction, affording precise setting of the distance between the said anvils without relying on the "feel" of the mechanic setting the master gage.

A further object hereof is to provide a novel and improved construction which assures that when the slidable jaw is secured at any position along the track bar, the anvil such movable jaw carries will be in proper aligned position.

Still a further object hereof is to provide a novel and improved master gage construction of the class set forth, which is reasonably cheap to manufacture, easy to use and efficient in carrying out the functions for which it is designed.

Other objects and advantages will become apparent as this disclosure proceeds.

In the accompanying drawings forming part of this specification, similar characters of reference indicate corresponding parts in all the views.

Fig. 1 is a front view of a master gage embodying the teachings of this invention.

Fig. 2 is a top plan view thereof.

Fig. 3 is an end view thereof minus the movable jaw.

Fig. 4 is a section taken at lines 4—4 in Fig. 2.

Figs. 5 and 6 are top plan views of the movable jaw employing modified forms of anvils thereon.

Fig. 7 is a perspective fragmentary view of a modified track bar and its associated movable jaw.

Fig. 8 is a perspective view of a part included in the embodiment illustrated in Fig. 7.

Fig. 9 is a section taken at lines 9—9 in Fig. 8.

In a preferred embodiment of this invention illustrated in the drawings, the numeral 15 designates a straight track bar carrying the jaws designated generally by the numerals 16 and 17 respectively. The jaw 16 is preferably fixed on said bar and comprises essentially a V-block whose angularly related faces 18, 19 diverge towards the jaw 17. Said track bar 15 being of non-circular cross section, carries jaw 17 in precise sliding fit thereon. Jaw 16 carries an anvil 20 which is directly opposite the anvil 21 carried on the jaw 17. Each of the opposite faces 20', 21' of said anvils is preferably part of a sphere respectively. The line joining the centers of said spherical forms is parallel to the bar 15, passes through said opposing anvil faces 20', 21' and bisects the angle formed by the surfaces 18, 19 of the V-block jaw 16.

The anvil 21 is preferably a spring-loaded slidable rod, urged by spring 22 towards the anvil 20. A suitable means is provided to lock such movable anvil 21 in any set position on the movable jaw 17 and such may comprise the set-screw 23 and the slidable saddle element 24, both carried by said movable jaw.

To set the anvils 20, 21 a required distance apart, the set screw 23 is loosened to free the anvil 21 for sliding movement. Standard precision measuring blocks not shown, are placed to rest on the bar 15 between the anvils. The slidable jaw 17 is shifted towards the fixed jaw 16 until anvil 21 contacts one end measuring block after the other end measuring block is placed in contact with the anvil 20 and all such blocks are in contact successively. Said jaw 17 is further moved towards the jaw 16, to cause part compression of the spring 22. Whereupon the slidable jaw 17 is secured in position on the track bar 15 by means of the set screws 25 and said anvil 21 is secured in its moved position on said movable jaw 17 by tightening the set screw 23. The master gage 14, upon removal of the measuring blocks, is now in prescribed set condition and ready for use.

The easiest way to attain a precise slide fit for the movable jaw on the track bar, is to have a circular bore 26 through the movable jaw 27 and a track bar 28 made of round bar stock. I have provided such in the modified construction shown in Fig. 7. Yet, I accomplish true alignment of the anvil 29 with the anvil 20 of the fixed jaw, when the set-screw 30 is tightened to secure the movable jaw 27 on the track bar 28.

The round bar of which track 28 is made, has milled therealong a channel 31 of V-shaped cross section, whose interior wall surfaces 32, 33 are in perpendicular relation with each other and each of said surfaces is parallel with the longitudinal axis of said bar. The fixed jaw 16 is so mounted on the track bar 28 that the planes of the surfaces 18, 19 are perpendicular to the channel surface 32 and symmetrical with respect to the longitudinal axis of said bar; meaning that said axis line bisects the angle between the said surfaces 18, 19. A gib 34 positioned within said bore 26 in the movable jaw, rides in said channel 31 along the track bar; said gib being loose in said channel when the screw 30 is loosened. Said gib 34 conforms with and contacts the channel surfaces 32, 33 when the screw 30 is tightened. The surface of said gib which is adjacent the surface of the bore 26, is provided with two niches 35, each having a flat floor 35' on which rest the respective ends of the screws 36; the latter being threadedly engaged in the body of the movable jaw 27. Said niches are spaced along the track bar direction. Intermediate said niches is a flat surface 37 against which the end of set-screw 30 acts; said surface being in angular relation with each of the perpendicularly related surfaces 38, 39 of said gib. Floors 35' are parallel with surface 38.

The screw 30 is preferably perpendicular to the surface 37 on the gib so that upon tightening said screw, the gib surfaces will contact their respectively adjacent V-channel surfaces. Upon continuing to tighten said screw 30, the movable jaw 27 will move about the longitudinal axis of the track bar 28 as an axis, until the tips of the screws 36 contact the floors 35' of the mentioned niches. It is evident that the said screws 36 provide adjustment means to assure that when said movable jaw 27 is tightly secured on the track bar 28 by means of the screw 30, the line joining the centers of the spherical forms 29 and 20' is parallel to the longitudinal axis of the said track bar 28. Of course, said anvil 29 on this movable jaw 27, is so positioned thereon that this condition can be accomplished.

Fig. 2 shows an internal bore gage 40 in position for being set or checked with the aid of the master gage 14; the manipulations for which are well known and evident to those versed in the art who have used other master gages. As shown, the master gage 14 and the gage 40 are associated so that the movable measuring pin 41 of gage 40 contacts the anvil 20, the centering pins 42, 43 contact the surfaces 18 and 19 respectively, and the fixed measuring pin 44 of said gage 40, contacts the anvil 21.

It may be noted that a ring 45 may be fitted on the anvil 21; said ring having a bore 45' in which the fixed measuring pin 44 of the gage 40 slidably fits. Or, the anvil 29 may be fitted with side plates 46, 46' to form a channel 47 in which said fixed measuring pin slidably fits.

It is to be specially noted that use of the channel 47 holds the gage 40 against side wiggle and that the use of the ring 45 to provide a socket for the close fit of the fixed measuring pin 44 of said gage 40, properly positions such gage in the master gage 14.

Of course, either or both of the jaws 16, 17 of the master gage may be movable and either or both of the anvils 20, 21 may be fixed, adjustable or provided with the mechanism shown in Fig. 4. Of importance however is that a single gage 14 can be made as herein shown, to accommodate all sizes of gages of the type 40 as may be desired, by having the surfaces 18, 19 in their horizontal dimension, long enough to suit and by having the anvil 20 slidable in the jaw 16 along the line bisecting the angle between said surfaces and by having means as for instance the set-screw 48 to fix the position of such anvil 20. A gage 14 for some sets of gages 40 may not even need the anvil 20 to be adjustable.

This invention is capable of various forms and applications without departing from the essential features herein disclosed. It is therefore intended and desired that the embodiments shown herein shall be deemed illustrative and not restrictive and that the patent shall cover all patentable novelty herein disclosed; reference being had to the following claims rather than to the specific description herein to indicate the scope of this invention.

I claim:

1. In a master gage for setting and checking an internal bore gage of the character described, a straight track bar, a first jaw fixed on the track bar, a second jaw opposite the first jaw; one of said jaws being provided with a channel; the surfaces of opposite walls of said channel being flat, in angular relation and diverge towards the other jaw, an anvil carried on each of said jaws respectively; a surface of one anvil facing a surface of the other anvil; that anvil which is on the jaw having the channel, being between said divergent walls of said channel; the mentioned parts of the master gage being so positioned that a line parallel to the track bar and passing through both said anvil surfaces, is the bisector of the angle between said divergent walls of the said channel; the second jaw having a circular bore therethrough; the track bar being positioned through such bore; said second jaw being slidably and rotatably fitted on said track bar; such track bar having a lengthwise channel of substantially V-shaped cross-section; the walls of said channel along the track bar being parallel to the mentioned line, a gib positioned within said bore and resting against the walls of said channel along the track bar; one of the surfaces of said gib being adjacent the surface of said bore in the second jaw; said gib in its said surface, being provided with a pair of niches in spaced relation along the track bar; each niche having a floor surface respectively; the second jaw having three spaced threaded holes therein, respectively commencing at and communicative with said bore and extending through the exterior surface of the second jaw, a set screw threadedly engaged in each of said threaded holes respectively; the intermediate screw bearing against said surface of the gib between said niches and positioned in a line so that when tightened, said intermediate screw will shift said gib into contact with both wall surfaces of the channel along the track bar; the other two screws extending into said niches respectively towards the floor surfaces of said niches respectively.

2. The master gage as defined in claim 1, wherein that portion of the surface of the gib contacted by the intermediate screw when the latter is tightened, is flat and in angular relation to both surfaces of the channel along the track bar.

3. The master gage as defined in claim 1, wherein the intermediate screw is in angular relation to the other two screws and said other screws are in parallel relation.

References Cited in the file of this patent

UNITED STATES PATENTS

| | | |
|---|---|---|
| 1,170,255 | Hess | Feb. 1, 1916 |
| 1,452,834 | Fuchs | Apr. 24, 1923 |
| 1,591,259 | Ames | July 6, 1926 |
| 2,514,605 | Holmberg | July 11, 1950 |
| 2,558,291 | Eisele | June 26, 1951 |
| 2,688,192 | Mannesson | Sept. 7, 1954 |